Dec. 8, 1942.   E. E. PRENTICE   2,304,595
SELF-ALIGNING ROD END BEARING
Filed June 10, 1941
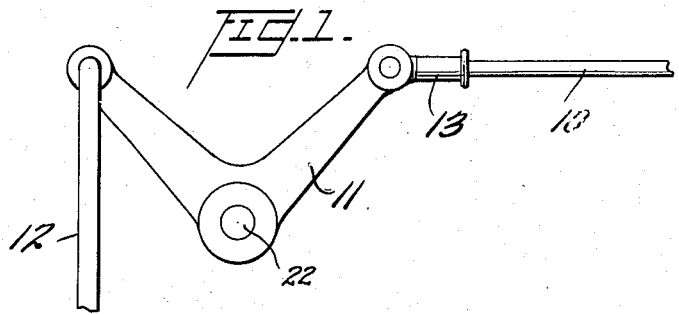
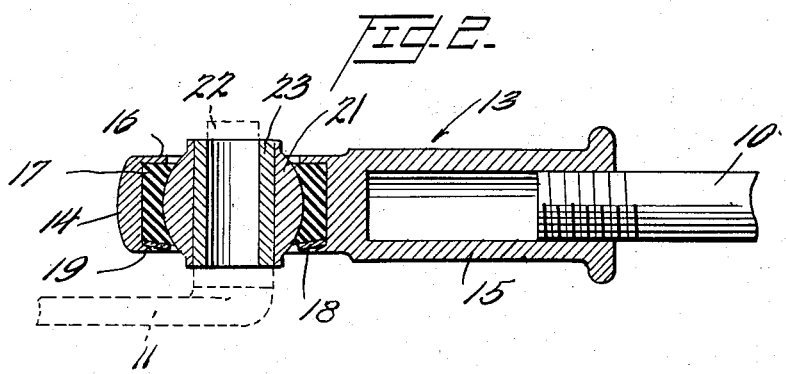
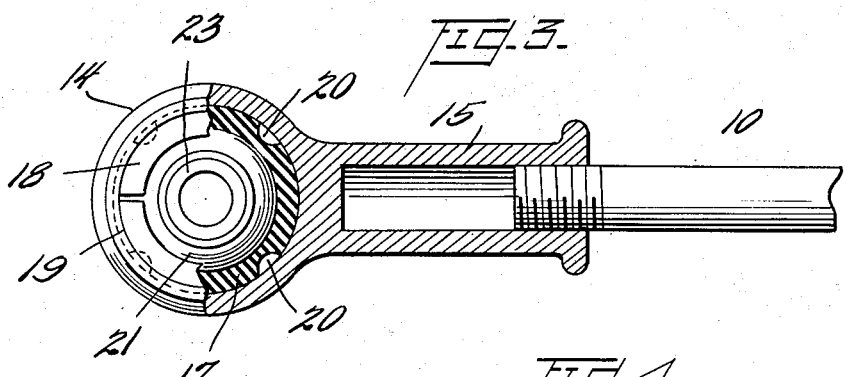
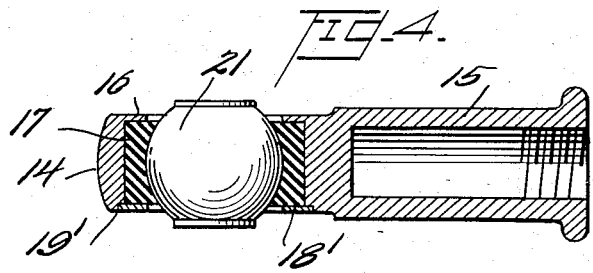
Inventor
Earl E. Prentice
By Watson, Cole, Grindle & Watson
Attorney Patented Dec. 8, 1942

2,304,595

UNITED STATES PATENT OFFICE 2,304,595

SELF-ALIGNING ROD END BEARING

Earl E. Prentice, Inglewood, Calif.

Application June 10, 1941, Serial No. 397,483

4 Claims. (Cl. 308—26)

This invention relates to self-aligning bearings and more particularly to "rod end" bearings for connecting a link of a push-pull control or other linkage to a rocker arm, bell crank lever or other element of the linkage, with provision for rotary movement between the bearing and the crank pin or other connecting element of the rocker arm or bell crank lever, and also with provision for angular movement of the bearing relative to the link with which it is associated, for alignment with the crank pin or other connecting element in all positions of the latter.

One important application of the present invention is in connection with control linkages for aircraft, both for engine control and the control of the movable surfaces of an aircraft, such as the elevators, ailerons and the like. However, it will be apparent that the present invention may be adapted for many and varied uses, not only in connection with control linkages for machines other than aircraft, but for mechanical linkages of all kinds.

A device of the present invention is especially adapted for use in applications where serious vibration is encountered, and to that end the bearing member proper is supported in rubber or other resilient shock resisting material. Similar devices heretofore used have been generally of two types, both of which possess serious disadvantages. In one type of rod end bearing commonly employed in connection with aircraft, the self-aligning feature is achieved by mounting the bearing member proper on anti-friction ball or roller bearings within the housing. This construction is not only expnsive, but it is relatively fragile and is given to rapid wear due to the intensive vibration to which it is subjected, such wear being inevitable when directly engaging metal parts are subjected to vibration.

In another type of connection, which is more properly called a rod end joint than a bearing, the member connecting with the rocker arm or bell crank lever is mounted in rubber or similar material within a housing which in turn is connected to the push-pull link, the rubber being bonded to both of the adjacent metal parts, or bonded to one of them and frictionally gripped by the other, so that all relative movements between the housing and the connecting member involved formation of the rubber mounting, and such relative movements are restricted to the permissible limits of such deformation. This type of device is disadvantageous first, in that no provision is made for rotary movement between the connecting member of the joint and the crank pin or other connecting element with which it engages and, secondly, because the deformation of the rubber mounting which is involved in any angular or rotational displacement of the connecting member and the housing results in stressing the rubber in such a way as to cause the latter to have a tendency to return the several elements of the linkage to their neutral position.

The device of the present invention avoids the aforementioned disadvantages by providing a bearing member adapted to rotatably receive a crank pin or other element adapted to have relative rotation therewith, said bearing member being movably mounted in a body of rubber or similar resilient material which is in turn carried in a housing, the bearing member being slidable over the face of the rubber body so that it may move into alignment with the crank pin or other element without deforming the rubber. The latter is therefore not stressed, except temporarily during relative movements of the two parts and then only to the extent of the frictional forces acting therebetween. There is no tendency for the rubber to urge the linkage into neutral position and, obviously, the rubber member will have a longer useful life than would be the case if the rubber were more or less continuously under stress. At the same time, the rubber member serves to insulate the bearing member against vibration and shock.

Other and further objects, features and advantages of the present invention will be apparent to one skilled in the art from the following description taken in connection with the accompanying drawing in which:

Figure 1 is a schematic view illustrating one application of a self-aligning rod end bearing according to the present invention;

Figure 2 is an axial section through a bearing constructed in accordance with the present invention;

Figure 3 is a side view partly in elevation and partly in section of the rod end bearing of the present invention; and Figure 4 is a sectional view on the plane of Figure 2, but illustrating a slight modification of the device of Figure 2 and showing the bearing member in elevation.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figure 1, the reference character 10 designates a link such as a tension or compression member of a control linkage or the like, which is adapted to transmit movement through a bell crank lever 11 to a further link 12. The link 10 and bell crank lever 11 are connected, as best seen in Figure 2, by means of the bearing of the present invention which is designated generally by the reference character 13.

The bearing 13 comprises an annular housing 14 of metal, provided with a shank 15 which is preferably made integral with the housing 14. The shank 15 is threaded internally to receive the correspondingly threaded end of the link 10. The housing 14 is provided at one of its lateral faces with an inwardly projecting annular flange 16. Supported within the housing 14 is an annular bushing 17 of rubber or other suitable resilient material, which is retained in place by means of the flange 16 and a spring washer 18 which may be inserted after the rubber bushing is in place within the housing, and may be retained by turning over the adjacent inner edge of the housing 14 as indicated at 19. In the modification illustrated in Figure 4, that face of the housing which is to receive the washer 18' is recessed as at 19', and the washer 18' is adapted to be secured in said recess with a pressed fit.

In order to enhance the resiliency of the rubber bushing 17, as well as to facilitate assembly of the device, the outer periphery of the bushing may be provided with spaced transversely extending recesses as at 20 in Figure 3. The inner periphery of the rubber bushing 17 is provided with a parti-spherical surface, and serves to support and retain a parti-spherical bearing member 21 which is provided with a central transverse aperture to receive a pin, shaft or the like designated by the numeral 22. Preferably, an anti-friction bushing 23 is provided to minimize friction between the bearing member 21 and the pin 22, but this is not essential.

The rubber bushing 17 may, if desired, be placed under some compression during the assembly of the device, in order to ensure close engagement and adequate support of the bearing member 21. However, it will be understood that the latter is adapted to move relatively freely over the face of the rubber bushing, without deforming the latter, in accommodating variations in alignment of the pin 22 as the linkage is actuated. It will further be understood that the pin 22 is freely rotatable relative to the bearing member 21, and that the device of the present invention is adaptable for any use in which a rotatable pin, shaft, or other element is to be accommodated in a rod end bearing.

The expression "parti-spherical" as employed above and in the appended claims, refers to a surface or a member having a surface corresponding to that portion of a spherical surface lying between two parallel planes intersecting the sphere.

Having thus described the invention, what is claimed as new and desired to be secured by Letters Patent is:

1. A self-aligning rod end bearing comprising an annular housing having a shank, an annular bushing of resilient material secured within said housing, and a parti-spherical bearing member movably mounted in said bushing and having sliding engagement therewith, whereby said bearing member may move relative to said bushing without displacing or deforming the material of said bushing, said bearing member being apertured to receive a shaft.

2. A self-aligning rod end bearing comprising an annular housing having a shank and having an inwardly extending annular flange adjacent one of its lateral faces, a bushing of resilient material within said housing, a washer adapted to cooperate with said housing to retain said bushing between said flange and said washer, and a parti-spherical bearing member movably mounted in said bushing and having sliding engagement therewith, whereby said bearing member may move relative to said bushing without displacing or deforming the material of said bushing, said bearing member being apertured to receive a shaft.

3. A self-aligning rod end bearing comprising an annular housing having a shank, an annular bushing of resilient material secured within said housing, said bushing having a parti-spherical inner surface, and a parti-spherical bearing member movably mounted in said bushing and having sliding engagement therewith, whereby said bearing member may move relative to said bushing without displacing or deforming the material of said bushing, said bearing member being apertured to receive a shaft.

4. A self-aligning rod end bearing comprising an annular housing having a shank, an annular bushing of resilient material secured within said housing, and a parti-spherical bearing member movably mounted in said bushing and having sliding engagement therewith, whereby said bearing member may move relative to said bushing without displacing or deforming the material of said bushing, said bearing member being apertured and bushed to receive a shaft.

EARL E. PRENTICE.